Figure 1:
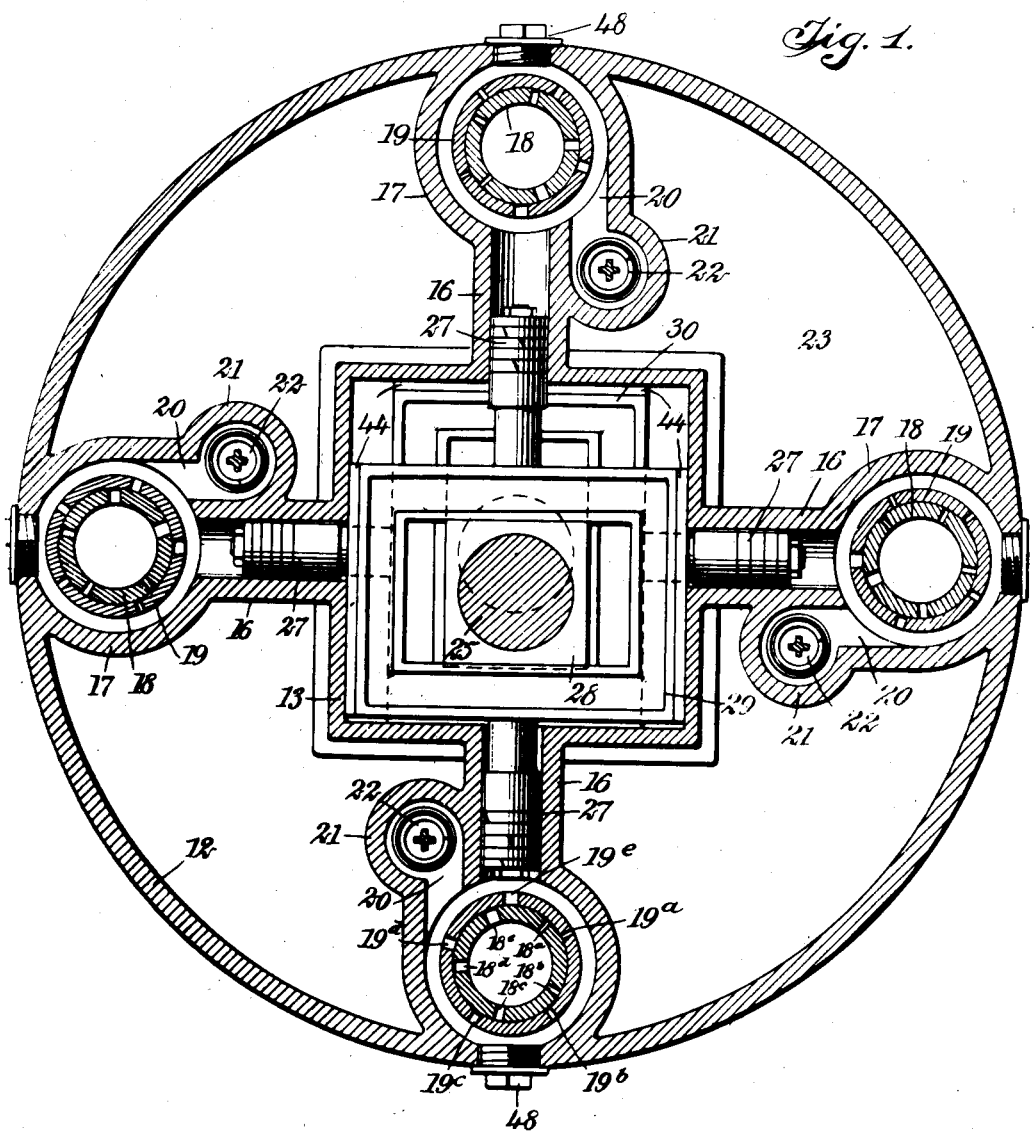

No. 871,033. PATENTED NOV. 12, 1907.
P. DANIEL.
CLUTCH.
APPLICATION FILED MAR. 11, 1907.

2 SHEETS—SHEET 1.

WITNESSES

INVENTOR
Paul Daniel
BY
ATTORNEYS

No. 871,033.
PATENTED NOV. 12, 1907.
P. DANIEL.
CLUTCH.
APPLICATION FILED MAR. 11, 1907.
2 SHEETS—SHEET 2
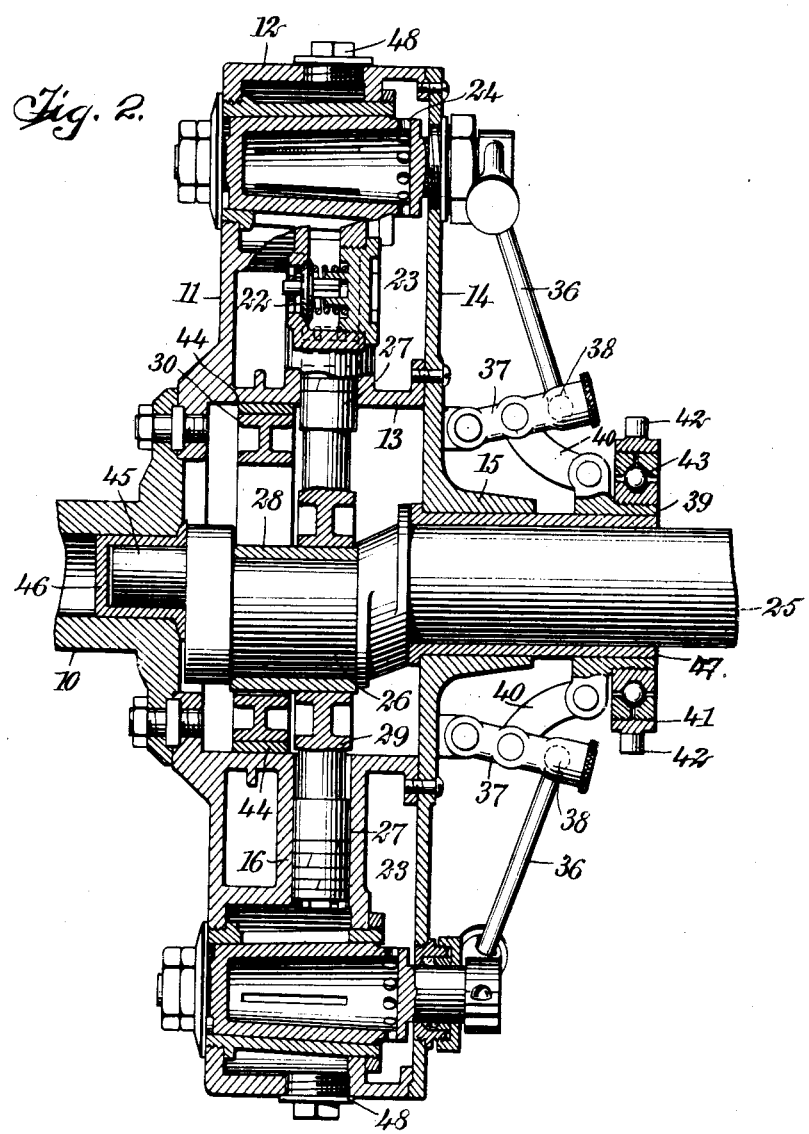
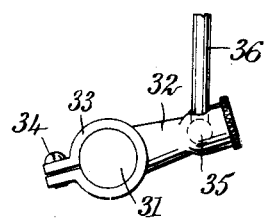
WITNESSES
INVENTOR
Paul Daniel
BY
ATTORNEYS

UNITED STATES PATENT OFFICE.

PAUL DANIEL, OF NEW YORK, N. Y.

CLUTCH.

No. 871,033.　　　Specification of Letters Patent.　　　Patented Nov. 12, 1907.

Application filed March 11, 1907. Serial No. 361,846.

*To all whom it may concern:*

Be it known that I, PAUL DANIEL, a citizen of the Republic of France, and a resident of the city of New York, borough of Manhattan, in the county and State of New York, have invented a new and Improved Clutch, of which the following is a full, clear, and exact description.

This invention relates to certain improvements in clutches adapted for connecting a driving member to a driven member, and more particularly to clutches adapted for use upon motor vehicles.

The object of the invention is to provide certain improvements whereby the connection between the driving member and the driven member is effected by means of a fluid which may freely circulate to permit one member to rotate in respect to the other, and which may be prevented from circulating to effect the simultaneous movement of the two members.

The invention consists in certain features of construction and combination of parts, all of which will be fully set forth hereinafter and particularly pointed out in the claims.

Reference is to be had to the accompanying drawings forming a part of this specification, in which similar characters of reference indicate corresponding parts in all the figures, in which Figure 1 is a transverse section through my improved device; Fig. 2 is a central longitudinal section; and Fig. 3 is a detail showing a part of the mechanism employed for rotating the controlling valves.

In my improved device it is entirely immaterial which of the two members is the driving member and which is the driven member, although for definiteness in description I apply the term "driving member" to the part carrying the plungers, and the term "driven member" to the part carrying the controlling valves. The driven member comprises a suitable casing, preferably cylindrical and secured in any suitable manner to the shaft 10. As shown, this casing is cylindrical in cross section and is provided with a flat wall 11 extending radially from the shaft 10 and rigidly secured thereto. Integral with the wall 10 are two walls extending outward at right angles thereto. One of these walls 12 constitutes the outer wall of the casing, and is preferably cylindrical, while the other wall 13 is preferably rectangular in cross section and located within the outer annular wall 12. Parallel to the radial wall 11 is an oppositely-disposed wall 14 rigidly secured to the circumferential wall 12 and to the rectangular wall 13 to form two separate chambers; one within the rectangular wall 13 and the other between the wall 13 and the circumferential wall 12. The wall 14 is provided with a bearing flange 15 which surrounds the driving member and serves to hold the two members in alinement.

Integral with the rectangular wall 13 and extending outward from each of the sides thereof is a cylinder 19 communicating with the space inclosed by the rectangular wall 13, and communicating at its outer end with a cylindrical chamber 17 containing a valve plug 18 and valve casing 19. The cylindrical chamber communicates by means of a passage 20 with a second valve chamber 21, within which is located a spring-pressed valve 22 controlling the flow of liquid from the annular space 23 between the wall 13 and the wall 12 to the chamber 17 containing the valve 18. This spring-pressed valve may be of any suitable construction, but it preferably moves in a line parallel to the axis of the rotating members rather than radially thereto, whereby it is unaffected by centrifugal force. The cylindrical chamber 17 does not extend to the full length of the casing, but terminates at a short distance from the wall 14, whereby the valve plug 18 may be made to communicate with the space 23. The valve casing 19 is provided with a plurality of longitudinal slots corresponding with the slots in the valve 18, whereby when the valve is rotated to the proper position, the fluid may freely pass from the interior of the valve plug to the cylindrical chamber 17 surrounding the valve casing. The valve plug 18 is provided adjacent one end thereof, with a plurality of perforations 24, whereby the interior of the valve plug is at all times in open and free communication with the annular space 23. It will thus be noted that when the valves are open, the fluid may freely pass from the chamber or space 23 through the spring-pressed valve 22 and passage 20 to the interior of the chamber 17, and from this chamber through the registering slots of the valve casing and valve to the interior of the valve plug and out through the perforations 24 to the chamber 23 again. If the valve plug 18 be rotated so that the slots in its wall and in the valve casing no longer register, a free circulation of the liquid is effectively prevented, as it may enter through the spring-pressed valve but cannot return.

The shaft 25 of the driving member extends through the bearing 15 of the driven member to the interior of the casing where it is offset to form a crank 26 for reciprocating the plungers 27 within the cylinders 16. These plungers may be operatively connected to the crank in any suitable manner, whereby as the shaft 25 rotates they are caused to reciprocate within their respective cylinders, but preferably I employ the mechanism illustrated, in which the crank 26 is surrounded by a square block 28 having two of its opposite sides exactly fitting the rectangular opening in a rectangular frame 29, and its other two opposite sides exactly fitting the rectangular opening in the rectangular frame 30. These two frames lie in parallel planes and within the rectangular wall 13, and each has its ends in contact with the opposite sides of said wall; thus, as the shaft 25 and crank 26 rotate, the square block 28 moves in a circle about the axis of rotation, and as it moves it slides longitudinally within the rectangular openings of both of the frames 29 and 30 and causes said frames to move laterally within the wall 13 and in directions at right angles to each other. Two of the plungers 27 are secured to opposite sides of the frame 29 and are caused to reciprocate within their respective cylinders by the lateral movement of the frame, while the other two plungers or pistons 27 are rigidly connected to the opposite sides of the other rectangular frame 30 and are caused to simultaneously move within their respective cylinders.

As the shaft 25 rotates it causes the simultaneous reciprocation of all of the plungers 27 as above described, and at all times two of these plungers will be moved inward toward the center of the casing and two of them will be moved outward. While the valve plugs 18 are turned, so that escape of liquid to the interior thereof is prevented, the inward movement of the plungers 27 causes the liquid within the space 23 to enter the passage 20, chamber 17 and cylinder 16 through the spring-pressed valve 22, but as the return movement of the piston begins the spring-pressed valve 22 closes and the return of the liquid to the space 23 is prevented. Any suitable liquid may be employed, but preferably a liquid which is unaffected by ordinary changes in temperature and non-compressible, as, for instance, glycerin. The liquid is prevented from escaping through the valve plug 18 and further movement of the piston in its cylinder is prevented; thus the entire casing and all of the parts secured thereto become locked to the driving member and motion is thus imparted to the driven member. While the valve plug 18 is open, the liquid entering the chambers 17 through the spring-pressed valves 22 may freely escape again to the space 23 and no motion is thus imparted to the driven member.

In order to control the valves 18 and open and close them at will, I provide suitable mechanism, the preferred form of which is illustrated in the drawings. Each of the valve plugs 18 extend outward through packings in the wall 14 and terminate in a valve stem 31. Rigidly secured to each valve stem is a valve lever 32, so connected to the valve stem that its position in respect to said valve may be readily adjusted, as, for instance, by means of a split band 33 having a connecting set screw 34. The valve levers 32 all lie in a plane parallel to the wall 14 and the outer end of each valve lever is provided with a socket within which lies a ball 35 carried by the end of a connecting rod 36. Adjacent the bearing 15 and pivotally connected to the plate 14 are a plurality of arms 37, each having a socket in its outer end receiving a ball 38 also carried by the connecting rod 36.

Rotatably and slidably mounted upon the shaft 25 is a collar 39 having a plurality of links 40 pivotally connected thereto and also pivotally connected to the arms 37. By moving the collar 39 longitudinally of the shaft 25, the links 40 cause the outward movement of the outer ends of the arms 37, and this outward movement is communicated to the ends of the valve levers 32 by means of the connecting rods 36; thus, all of the valve plugs 18 may be simultaneously rotated by the longitudinal movement of the collar 39, which latter may be connected by any suitable mechanism to a controlling device. As shown, the collar 39 is surrounded by a non-rotatable collar 41 having studs 42, whereby it may be connected to the operating lever, and intermediate the rotating collar 39 and the non-rotatable collar 41, I preferably provide ball bearings 43 of any suitable character.

It is evident that the degree to which the valve plugs are rotated will depend directly upon the extent to which the collar 39 is moved longitudinally, and thus the extent to which the valves are opened may be readily controlled; but in order to further control the flow of liquid, I provide the peculiar arrangement of slots hereinafter described. The valve plugs 18 are provided with a plurality of slots as above stated, and these slots exactly correspond in number and size with the slots of the valve casing 19, but the slots are of such size and so arranged that any desired number of them may be brought into registry at a time. As shown, no two adjacent slots are of the same size, and the width of each slot is an exact multiple of the width of the narrowest slot. The slot $18^a$ is illustrated as being of the unit width; the slot $18^b$ of a width exactly twice as great; the slot $18^c$, three times as great, and the slots $18^d$ and $18^e$ of four and five times the size of the slot $18^a$. Corresponding to these slots both in size and location are the slots $19^a$, $19^b$, $19^c$, $19^d$ and $19^e$ of the valve casing 19. When the slot $18^a$ is brought into registry with the slot $19^a$, all of the slots of the valve will register with the corresponding slots in the valve casing, and thus the valve will be opened to the maximum extent; but if the valve 18 when in the position illustrated in Fig. 1, be rotated a very short distance clockwise, the slot $18^e$ will overlap the slot $19^e$ to form a passage of the unit width before any of the other slots are brought into registry. With the valve in this position, only one slot of the valve registers with one slot of the valve casing and the valve is opened to the minimum extent. By rotating the valve to a slightly greater extent, the passage through the slots $18^e$ and $19^e$ will be enlarged to double the width and the slots $18^d$ and $19^d$ will overlap to form a passage of the unit width; thus, two passages will be formed, one of the unit width and one of twice the unit width. By further rotating the valve each of the passages are brought into registry in succession, and the size of each of the passages already opened will be gradually increased until all of them register and all at the maximum width.

As the flow of fluid through the valve plug and valve casing may be readily controlled, and as the pistons would normally reciprocate within the cylinders at a uniform speed, it is evident that the speed at which they reciprocate may be controlled by controlling the escape of fluid, namely, by moving the valves in the manner above described. As the driven member is free to rotate, and when it does rotate there is no relative movement of the pistons and cylinders, it is evident that the relative speeds of the driving and the driven members may be controlled by controlling the relative speeds of the pistons and cylinders, which latter is accomplished by means of the valves in the manner above described. Thus, by the use of my improved clutch, the necessity for gearing for producing different speeds, except for reversing and for stepping up the speed of the driven member, is obviated, and the speed of the driven member in respect to the driving member controlled solely by the extent to which the valve plugs 18 are rotated.

Various minor features may be employed in connection with the parts above described, whereby the amount of friction is reduced and the mechanical operation of the parts effected with minimum friction. As shown, the rectangular frames 29 and 30 are each provided with separable bearing plates 44 in engagement with the wall 13, and the reduced end 45 of the driving member is provided with a cap 46 fitting within a socket in the shaft 10 and forming a bearing surface. These plates and cap may be removed and replaced whenever the parts become so worn as to necessitate such action. The bearing collar 15 and the collar 39 may be mounted upon the shaft 25 independently of each other if desired, but are preferably both mounted on an anti-friction bearing sleeve 47 rigidly connected to the collar 15, and having the collar 39 connected thereto and movable longitudinally thereof.

The outer wall of the casing is preferably provided with screw plugs 48 in alinement with the cylinders 16, whereby the cylinders may be more readily bored out in the making, and whereby the packing rings on the pistons may be more readily secured in place or re-adjusted after having become worn.

Various changes may be made in the specific construction above described and within the scope of the appended claims, without departing from the spirit of my invention.

Having thus described my invention, I claim as new and desire to secure by Letters Patent:

1. A clutch, comprising a driving member and a driven member, one of said members comprising a casing adapted to contain a fluid, a rectangular guiding wall supported therein, radially disposed cylinders extending outward from said wall, pistons operating within said cylinders, and members slidably mounted within said rectangular wall and in engagement with opposite sides thereof for operating said pistons.

2. A clutch comprising a casing, a rectangular wall supported therein, cylinders extending outward from said wall, pistons operating within said cylinders, and members slidably mounted within said rectangular wall and movable in directions at right angles to each other for operating said pistons.

3. A clutch comprising a rectangular wall having a cylinder extending outward from each of the four sides thereof, and two members slidably mounted within said wall and movable in directions at right angles to each other, each of said members engaging with two opposite sides of the rectangular wall and having two pistons carried thereby to operate within the cylinders of the other oppositely disposed walls.

4. A clutch comprising a rectangular wall having a cylinder extending outward from each side thereof, two rectangular frames slidably mounted within said wall and movable in directions at right angles to each other, pistons carried by the opposite sides of each of said frames, a crank, and a block within each of said frames, whereby upon the rotation of said crank the frames are simultaneously operated to move all of said pistons.

5. A clutch comprising a driving member and a driven member, one of said members comprising a casing adapted to contain a liquid, a rectangular wall within said casing and adapted to confine the liquid within the space between said casing and wall, and cylinders extending outwardly from the sides of said wall, and the other of said members comprising two frames slidably mounted within said rectangular wall and movable in directions at right angles to each other, pistons carried by said frames and mounted within said cylinders, and a crank extending through both of said frames and operatively connected thereto, whereby as said crank is rotated in respect to the casing, said frames are moved laterally and all of said pistons reciprocated.

6. In combination, a cylinder, a piston operatively mounted therein, a valve casing in communication with said cylinder, said casing being provided with a series of openings, a valve mounted within said valve casing and having a series of openings corresponding to the openings of the valve casing, and means for operating said valve to bring any desired number of the openings therein into registry with the corresponding openings of the valve casing.

7. In combination, a cylinder, a piston operatively mounted therein, a valve casing in communication with said cylinder, said casing being provided with a series of openings of gradually increasing size, a valve mounted within said valve casing and having a series of openings corresponding to the openings of the valve casing, and means for operating said valve to bring any desired number of the openings therein into registry with the corresponding openings of the valve casing.

8. In combination, a cylinder, a piston operatively mounted therein, a valve casing in communication with said cylinder and having a series of ports of different sizes, the variation in size being uniform, a valve having ports corresponding to the ports in the valve casing, and means for operating the valve to bring any desired number of ports of the valve into communication with the corresponding ports of the valve casing.

9. In combination, a cylinder, a piston operatively mounted therein, a valve casing in communication with said cylinder and having a plurality of ports therein, said ports being of different sizes, and the variation in size being uniform, a hollow valve plug within said casing and having ports corresponding to the ports of the valve casing and having a series of openings independent of the casing, and means for rotating said valve plug to bring any desired number of the first mentioned ports into communication with the corresponding ports of the valve casing.

10. In combination, a driving member, a driven member, a plurality of cylinders carried by one of said members, a plurality of pistons carried by the other of said members, and a plurality of valves for controlling the flow of fluid through said cylinders, each of said valves comprising a casing having a plurality of ports therein of different sizes, the variation in the size of said ports being uniform, and a valve plug within said casing and having ports corresponding to the ports of the valve casing, and the valve plug being provided with a plurality of openings adjacent one end thereof independent of the casing, and means for rotating said valves simultaneously.

11. In combination, a driving member, a driven member, a plurality of cylinders carried by one of said members, a plurality of pistons carried by the other of said members and operating within said cylinders, means for automatically admitting fluid to each of said cylinders, means for controlling the escape of fluid from each of said cylinders, and means for simultaneously operating each of said outlet controlling means.

12. In combination, a driving member, a driven member, a plurality of cylinders carried by one of said members, a plurality of pistons carried by the other of said members, and a plurality of valves for controlling the flow of fluid through said cylinders, each of said valves comprising a hollow valve plug, a casing surrounding said valve plug but of shorter length than said plug, said plug and casing being provided with registering openings of varying sizes, and the valve plug being provided with a plurality of openings adjacent one end thereof and independent of said casing.

13. In combination, a driving member, and a driven member, one of said members having a rectangular guiding wall, a plurality of cylinders connected thereto, and means for controlling the flow of fluid through said cylinders, and the other of said members comprising a crank within said guiding wall, a plurality of pistons operating within said cylinders, and means contacting with said guiding wall and operated by said crank for effecting the reciprocation of said pistons.

In testimony whereof I have signed my name to this specification in the presence of two subscribing witnesses.

PAUL DANIEL.

Witnesses:
CLAIR W. FAIRBANK,
EVERARD B. MARSHALL.